US012143005B2

(12) United States Patent
Patil et al.

(10) Patent No.: US 12,143,005 B2
(45) Date of Patent: Nov. 12, 2024

(54) DYNAMIC ADJUSTMENT OF DAMPING OF A FILTER OF AN INVERTER

(71) Applicant: Lunar Energy, Inc., Mountain View, CA (US)

(72) Inventors: Devendra Patil, Milpitas, CA (US); Mark Holveck, Sunnyvale, CA (US)

(73) Assignee: Lunar Energy, Inc., Mountain View, CA (US)

( * ) Notice: Subject to any disclaimer, the term of this patent is extended or adjusted under 35 U.S.C. 154(b) by 0 days.

(21) Appl. No.: 18/217,922

(22) Filed: Jul. 3, 2023

(65) Prior Publication Data

US 2024/0039392 A1  Feb. 1, 2024

Related U.S. Application Data

(63) Continuation of application No. 17/965,198, filed on Oct. 13, 2022, now Pat. No. 11,742,744.
(60) Provisional application No. 63/315,487, filed on Mar. 1, 2022.

(51) Int. Cl.
*H02M 1/12* (2006.01)
*H02J 3/38* (2006.01)
*H02M 7/5387* (2007.01)

(52) U.S. Cl.
CPC ............... *H02M 1/12* (2013.01); *H02J 3/381* (2013.01); *H02M 7/5387* (2013.01); *H02J 2300/24* (2020.01)

(58) Field of Classification Search
CPC ........ H02M 1/12; H02M 7/5387; H02J 3/381; H02J 2300/24
See application file for complete search history.

(56) References Cited

U.S. PATENT DOCUMENTS 11,742,744 B1 * 8/2023 Patil ...................... H02M 1/126
363/41
2019/0229646 A1  7/2019 Liu

* cited by examiner

*Primary Examiner* — Rafael O De Leon Domenech
(74) *Attorney, Agent, or Firm* — Van Pelt, Yi & James LLP (57) ABSTRACT

A power system including an inverter comprising an LCL filter is disclosed. The LCL filter includes a first inductor, a capacitor, and a second inductor. The power system further includes a controller. The controller is configured to determine an electrical characteristic of an output of the inverter. It is further configured to, based at least in part on the determined characteristic of the output of the inverter, dynamically adjust damping of the LCL filter.

18 Claims, 6 Drawing Sheets

DYNAMIC ADJUSTMENT OF DAMPING OF A FILTER OF AN INVERTER

CROSS REFERENCE TO OTHER APPLICATIONS

This application is a continuation of U.S. patent application Ser. No. 17/965,198, entitled INVERTER CONTROL filed Oct. 13, 2022 which is incorporated herein by reference for all purposes, which claims priority to U.S. Provisional Application No. 63/315,487, entitled INVERTER CONTROL filed Mar. 1, 2022 which is incorporated herein by reference for all purposes.

BACKGROUND OF THE INVENTION

There are various challenges when designing inverters such as those that connect with PV (photovoltaic) solar panels and the utility grid. Examples of challenges for such inverters include those relating to distortion and instability.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein are embodiments of inverter control. Using the techniques described herein, an inverter with a second order LCL filter is controlled such that harmonic distortion is reduced while instability is also reduced.

Figure 1:
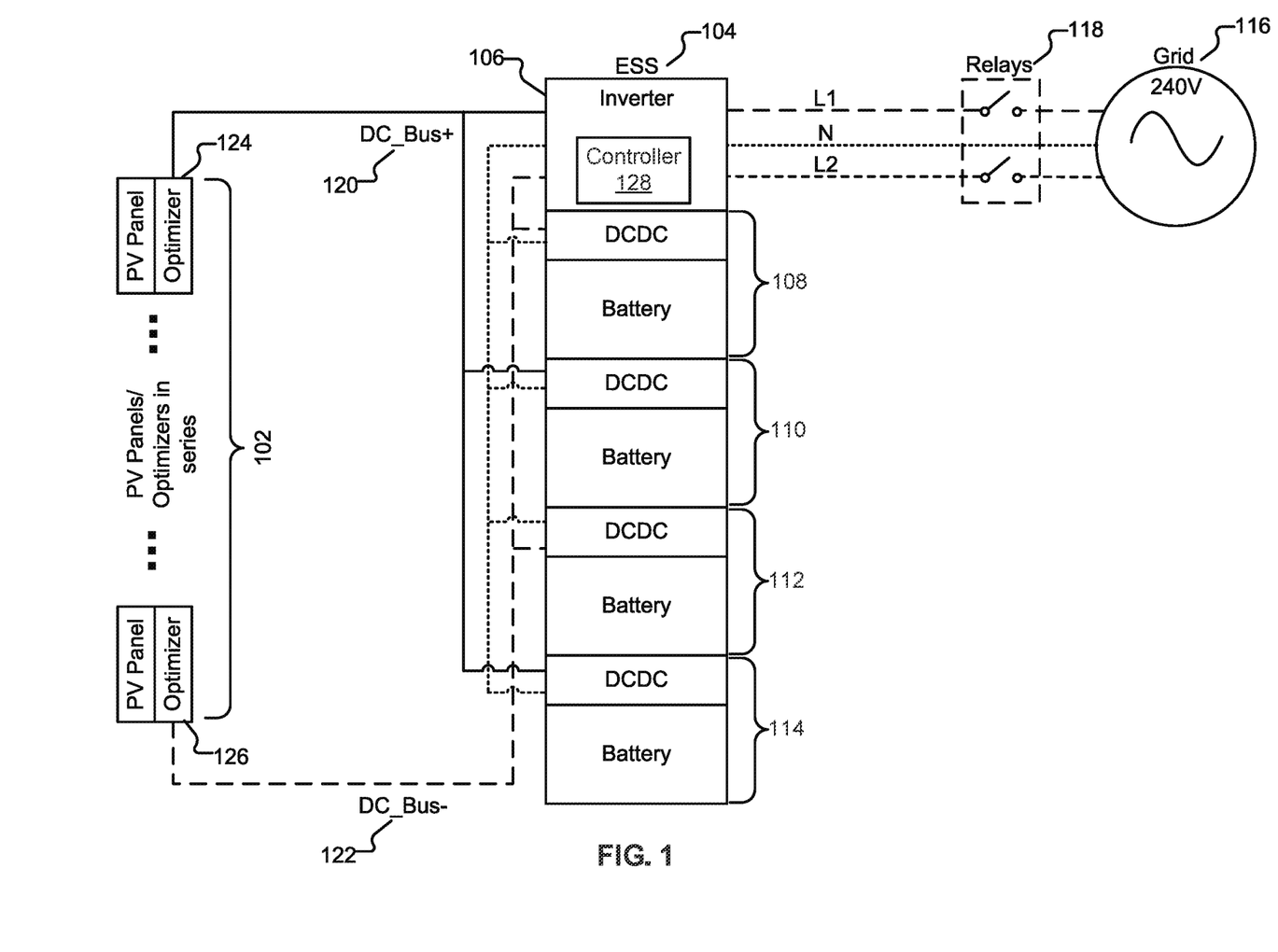
FIG. 1 illustrates an embodiment of an electrical power system.

FIG. 1 illustrates an embodiment of an electrical power system. In the example of FIG. 1, the electrical power system includes an array of photovoltaic (PV) panels 102, and an energy storage system (ESS) 104. As shown in this example, each of the PV panels is connected to a corresponding optimizer. The power optimizers are arranged in series. In this example, the ESS 104 includes inverter 106. The ESS also includes battery modules 108, 110, 112, and 114. Each battery module includes a battery storage (or any other type of energy storage as appropriate) and a DC-DC converter. The inverter connects to the electrical wiring of a site (e.g., home site). The inverter is also connected to grid 116 (e.g., utility grid). In the example shown, a set of relays (118) is between the inverter and the grid, allowing control of whether the inverter is connected to the grid (where the inverter is then referred to as operating in a "grid-tied" or "grid-connected" mode), or disconnected from the grid (where the inverter is then referred to as being in a "standalone" mode). In this example, the inverter includes controller 128, which is configured to provide damping control of the inverter in both grid-tied and standalone scenarios. Further details regarding controller 128 and damping are described below.

In the example of FIG. 1, the inverter is of a split bus architecture, where the inverter DC (Direct Current) bus at the input of the inverter is split into two halves, a positive half of the DC bus 120 (DC_Bus+), and a negative half of the DC bus 122 (DB_Bus−). As shown in this example, the positive half of the DC bus (120) is connected to an output terminal of the "top" optimizer 124, and the negative half of the DC bus (122) is connected to an output terminal of the "bottom" optimizer 126.

Figure 2:
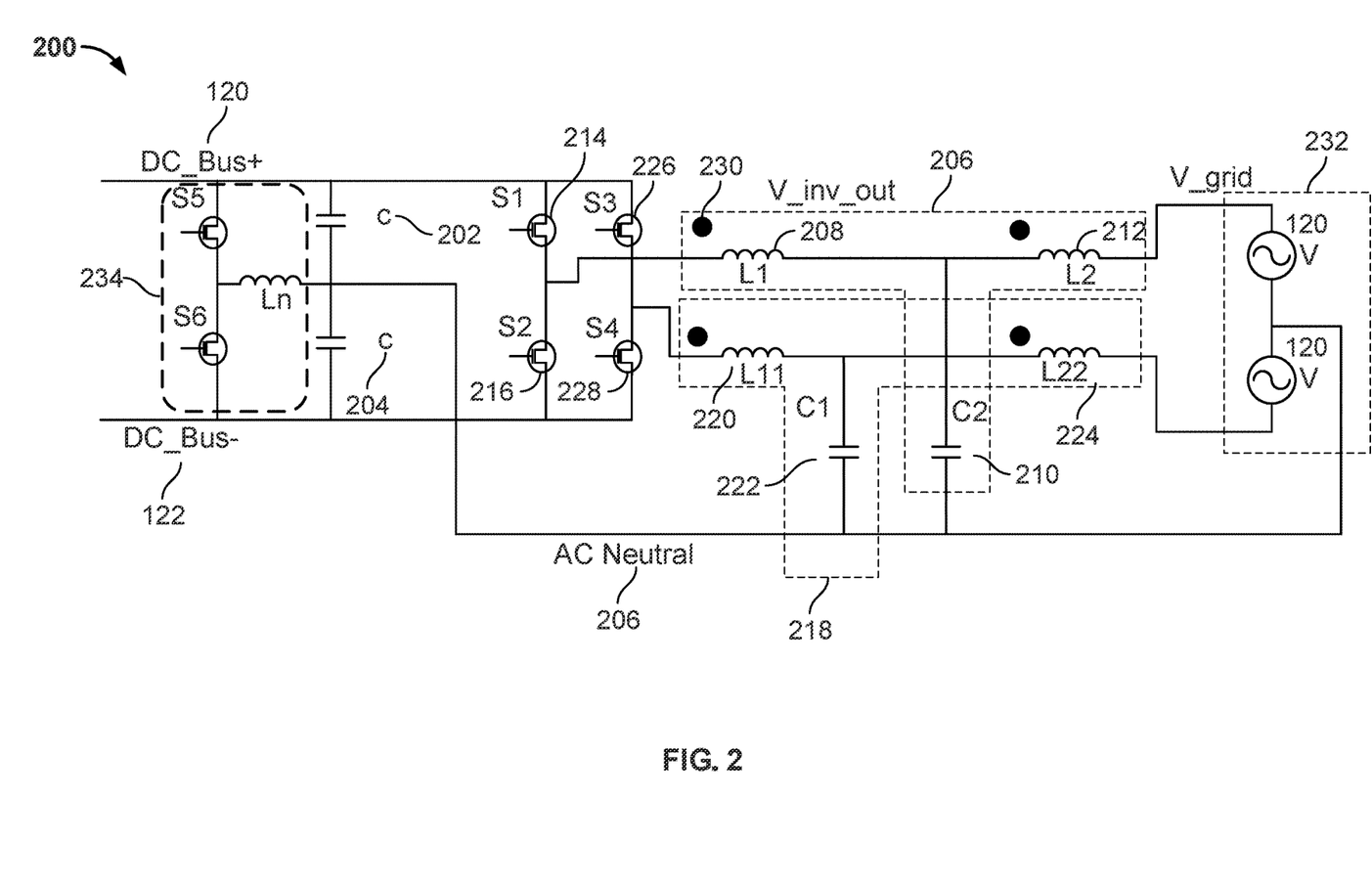
FIG. 2 illustrates an embodiment of an inverter.

FIG. 2 illustrates an embodiment of an inverter. In some embodiments, inverter 200 is an example of inverter 106 of FIG. 1. In this example, the inverter is a voltage source inverter topology, where the inverter includes a voltage source mechanism. In the example shown, the inverter is a split phase inverter with a neutral balancing leg. In the example of FIG. 2, the inverter is tied to the grid 232 (e.g., relays 118 are closed).

In this example, in which the inverter is used in conjunction with a split bus architecture, the inverter DC bus includes two capacitors (202 and 204) in series, with a midpoint connected to AC neutral (206). In some embodiments, as shown in the example of FIG. 1, the inverter is included in a power system that includes an energy storage system (ESS) that, for example, includes battery modules. In some embodiments, the battery modules in the system connect to one capacitor or the other (202 or 204). In the example system of FIG. 1, two battery modules are connected to each half of the bus. In some embodiments, the balancer leg 234 (which includes switches S5 and S6 and inductor Ln) of the inverter is a third phase that is connected directly to the midpoint of the bus. The balancer leg is used, for example, to hold the midpoint of the bus at half the voltage of the bus. In some embodiments, the balancer leg achieves this by moving current from the top half to the bottom half, or vice-versa, in order to regulate the two halves to be equal to each other.

In this example, the split phase inverter includes two LCL (inductor-capacitor-inductor) filters. For example, the first LCL filter (206) includes inductor L1 (208), capacitor C2 (210), and inductor L2 (212). The second LCL filter (218) includes inductor L11 (220), capacitor C1 (222), and inductor L22 (224). As shown in this example, the input to the LCL filter 206 is controlled via switches S1 (214) and S2 (216), and the input to the LCL filter 218 is controlled via switches S3 (226) and S4 (228).

Each of the LCL filters has an output that connects to the grid (where there may be a relay between the outputs of the inverter and the grid, as shown in the example of FIG. 1).

In the example of FIG. 2, the inverter includes two portions, a square-wave generation portion, and a sine-wave generation portion (which is configured to convert the square-wave into a sinusoidal wave by removing or filtering out higher frequency components). Considering one leg of the inverter, the manipulation of switches S1 and S2 results in a high frequency square waveform at 230. In this example, the output of the inverter is a high frequency square PWM (pulse-width-modulated) wave form. This voltage wave form is not sinusoidal, and the current may not be exactly sinusoidal. In this example, an LCL filter is used to convert the square wave to, for example, a sinusoidal wave (e.g., by removing or filtering out various frequencies or harmonics).

In order for the inverter to be connected to the grid or a load, there may be standards with requirements that dictate the characteristics of the output of the inverter. For example, in order to connect the inverter to a load or the grid, one requirement is that the voltage/current waveform be sinusoidal, and that the total harmonic distortion (THD) of the current wave form be below a threshold (e.g., 5%). With this requirement, the current wave form should be sinusoidal (and not a square wave form or some other arbitrary wave form). The LCL filter is configured to, for example, "clean" the current and eliminate the high frequency components of the square wave (that are not the 60 Hz component specified in the United States). For example, the 60 Hz component is boosted, and the high frequency components are filtered out.

For example, the output voltage of the square wave generation portion of the inverter is an input to the LCL filter made up of L1, C2, and L2. The LCL filter is used to convert the high frequency square waveform into an AC sinusoidal waveform (e.g., 60 Hz AC sine wave, that matches grid current and that is in a form deliverable to a home). The frequency of the AC waveform is determined by the resonant frequency of the LCL filter. Thus, as shown in this example, the inverter output voltage (square wave) is connected and converted through the LCL filter to the grid.

Due to ringing of the frequency into the 60 Hz AC waveform however, the inverter system may become unstable. For example, in a grid-connected system, the inverter may be considered as one voltage source, and the grid to be another voltage source, where there are thus two voltage sources connected via the LCL filters (where the two voltage sources should not be directly connected together). Even a small change in current may result in instability, where a high current flows into the grid or out of the grid. In a standalone system, there is one voltage source, which is the inverter voltage source. While the grid is not connected, the loads on the inverter will be the electrical loads being served by the inverter (e.g., resistive loads in the house). In the standalone case, the current is limited by the inverter. However, in the grid-connected scenario, the current flowing into or out of the system is not limited by the inverter (as it will also be dependent on grid voltage, which may fluctuate). Rather, instability may result in the grid providing a large amount of current that may damage the inverter.

The damping techniques described herein stabilize the behavior of the inverter system, preventing oscillations and ringing. For example, as described above, the instability may result in large amounts of current into the inverter system, damaging components such as the switches. The damping described herein prevents, for example, oscillations or ringing in the current flowing between the input and output of the LCL filter (between the output of the switches and the grid).

While the inverter shown in the example of FIG. 2 is grid-tied (e.g., relays 118 are closed, and the inverter is connected with the grid), there may still be instability when the inverter is operating in a standalone mode and the inverter is disconnected from the grid (though likely to be smaller relative to the instability experienced when grid-tied), and the damping techniques described herein may also be applied when in such a standalone mode to dampen any oscillations or ringing.

Further details regarding the LCL filter and its control are described below. While embodiments of inverter control are described herein with respect to a single LCL filter for purposes of clarity, the control techniques described herein apply to both LCL filters of the inverter shown in FIG. 2.

In contrast to the LCL filters of the inverter described herein, some existing inverters include LC filters. However, there may be various issues with using LC filters. For example, large values of inductance (L) and capacitance (C) (which in turn involve physically large components) may be needed in order to reduce the total harmonic distortion (THD) of the current (in order to produce, for example, a smooth sine wave).

In this example, rather than using a first order filter such as an LC filter, an LCL filter, a type of second order filter, is used. The use of an LCL filter has various benefits. For example, small values for L and C (and thus physically smaller components) may be used in order to remove harmonics. The LCL filter also has a higher roll-off frequency, with a sharp cutoff frequency.

While the LCL filter allows for the use of smaller components, the second order nature of the transfer function between the output and the input of the inverter may be more prone to instability. For example, as described above, once connected to the grid, the grid current may not be stable. While the inverter is grid tied, if the voltage on the grid were perfectly sinusoidal, the filter may operate stably. However, the grid voltage is likely to have various imperfections, which may cause the filter to ring and oscillate. For example, given the instability of the filter, any imperfection in the sine wave of the grid (or imperfections in the switching side) may cause oscillations, which could result in ringing being exhibited in the currents on the output of the filter. For example, there may be ringing voltages in the resonant capacitors. As one example, there may be various overshoots in the current, which may introduce an oscillation in the current waveform being outputted by the LCL filter (which will be impacted by the grid voltage, which may fluctuate unpredictably).

As described above, the LCL filter is used to provide smooth current into the grid. The use of an LCL architecture allows a large amount of smoothness for much less inductance (as compared to using a single large inductor, such as in the case of an LC filter), but with a potential side effect of ringing and oscillating due to the interaction of the inductances and capacitances (as well as imperfections in switches, grid voltage, etc.).

Described in further detail below are embodiments of a damping system to reduce such oscillations in the current waveform outputted from the LCL filter (so that a smooth and stable sinusoidal current waveform is produced). Using the inverter control and damping techniques described herein, an optimized filter is provided, in which smoothness is provided with the filter, while the side effect of oscillation is also reduced. That is, using such an optimized and damped filter as described herein, when synchronizing with the grid, rather than using a large inductor (which may be expensive and physically large and take space), a second order LCL filter with smaller inductors may be used that is also damped using the control techniques described herein to prevent oscillations when the signal on the grid has variants. This allows the use of a smoothing filter architecture that is stable, even when using small inductors in a second order filter configuration.

While examples involving voltage source inverter topologies are described herein for illustrative purposes, the damping techniques described herein may be applied to any other type of inverter topology that includes an LCL filter. Further, while examples involving a split phase inverter are described herein for illustrative purposes, the control techniques described herein may be variously adapted to accommodate any other type of inverter that includes an LCL filter.

Figure 3:
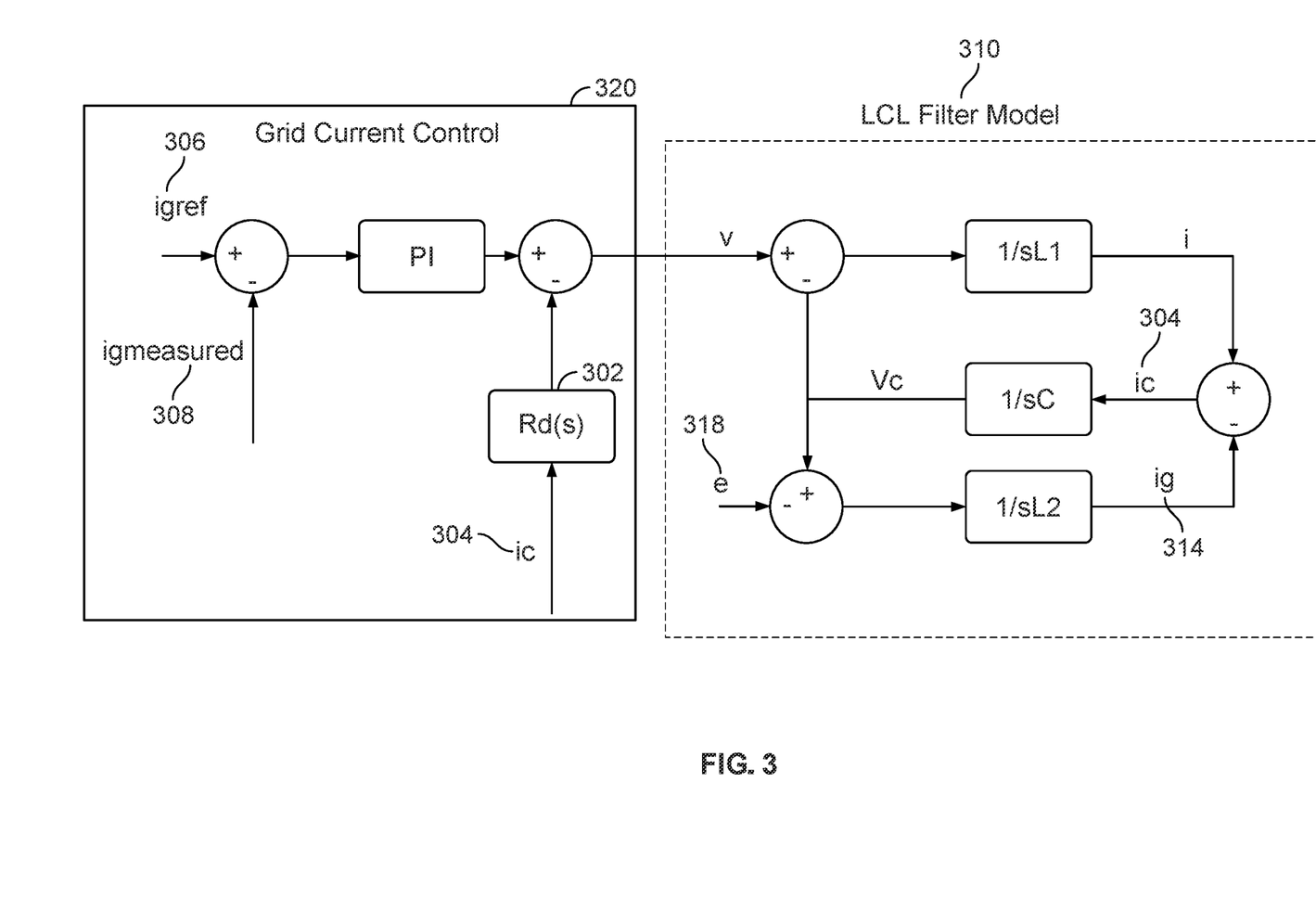
FIG. 3 illustrates an embodiment of an LCL filter model and control.

FIG. 3 illustrates an embodiment of an LCL filter model (310) and grid current control (320) using PI (Proportional-Integral) control, along with damping control. In this example, the LCL filter of an inverter is modelled according to KVL (Kirchhoff's Voltage Law) analysis, as applied to the example inverter of FIG. 2. For example, KVL analysis is performed on the inverter circuit of FIG. 2 to implement the model 310 of the inverter. For illustrative purposes, in the example of FIG. 3, the LCL filter model 310 is a model of the LCL filter 206 of FIG. 2 that includes L1, L2, and C2 (where the embodiments described herein also apply to the other LCL filter of FIG. 2 that includes L11, L22, and C1). In the example of FIG. 3, "e" (318) is grid voltage. An example of a transfer function for the damping is provided below. In this example, the damping transfer function is a second order transfer function, which is used to implement a virtual series RLC circuit in series with capacitor C. That is, in some embodiments, damping is provided by emulating a virtual impedance (e.g., virtual resistance) in series with the capacitor of the LCL filter, where this emulated impedance is dynamically adjustable, allowing, for example, THD to be tuned to within an acceptable range. This addition of impedance has multiple benefits:

1. It stabilizes the LCL filter transfer function with damping impedance
2. With respect to variation, the filter inductance value (i.e., L1 and L2 of FIG. 2) of the damping impedance can be tuned to reduce the THD in the current that is output from the filter and to also obtain a wide range of stability for wide variation in filter inductance.

Wide variation of filter inductance may be due in part to the fact that inductance is a function of current, where at higher current, the inductance of the filter reduces (that is, the inductances are not fixed values, but may change with different amounts of current). Therefore, the techniques described herein may be used to ensure stability and lower THD in grid current even as inductance changes.

In some embodiments, the voltage across the virtual impedance (current through capacitor multiplied by virtual impedance value) described herein is subtracted from a voltage reference to the inverter, which in turn is equivalent to an impedance connected in series with capacitor C (e.g., capacitor C1 or C2 of FIG. 2).

$$\frac{i_g}{v} = \frac{\frac{1}{Ls}\left(s^2 + \frac{R_d(s)}{L_g}s + z_{LC}^2\right)}{s^2 + \frac{L_I + L_g}{L_{inv}L_g}R_d s + w_{res}^2}$$

In this example, the transfer function between the current at the point of the output of the LCL filter (which is also a function of the grid current) (ig in the above transfer function) over the voltage at the input of the LCL filter (v in the above transfer function) is calculated, for example, using a Laplace transform.

The following is an example of the transfer function for the damping algorithm:

$$R_d = \frac{R}{(1 + a_0 s + a_1 s^2)}$$

(The $R_d$ here is the same as the Rd in the ig/v transfer function above). In this example, $R_d$ is equal to R divided by $(1+a_0 s+a_1 s^2)$.

In some embodiments, the damping algorithm is implemented in a controller (e.g., via firmware) as shown in the example of FIG. 3 (e.g., at Rd(s) 302). In some embodiments, the controller is an example of controller 128 of FIG. 1. In some embodiments, the controller is configured to control the inverter to behave as if there were a resistor in series with the capacitor of the LCL filter. In some embodiments, capacitor current (ic, 304) is measured and passed through as an input to damping impedance (Rd(s), 302), where it is then subtracted from the reference voltage to the inverter. For example, the voltage resulting from ic through Rd is used to determine the duty cycle for the PWM modulator for modulating the switches that generate the square wave voltage output. This in turn affects what the output current ig (314) will be (according to the transfer function). In this way, the grid current is controlled in a manner as if there were the virtual resistance in series with the capacitor of the LCL filter.

As described above, the damping algorithm is implemented, in some embodiments, in a controller such as a microcontroller. In various embodiments, the microcontroller is used to implement various aspects of a control system, such as the PI controllers, PR controllers, etc., further details of which are described below.

In some embodiments, the algorithm is dynamically adjustable. For example, the parameters R, a0, and a1 may be adjusted to affect Rd (and ultimately affect grid current). This is in contrast to using a constant parameter for damping (e.g., a fixed damping factor). Rather, using the techniques described herein, online and dynamic tuning is able to be performed. For example, the parameters of the damping are dynamically variable according to the load, electrical characteristics of the filter output (e.g., Total Harmonic Distortion), as well as with respect to parameter variation (e.g., variation of inductance and/or capacitance that may occur over time).

As will be described in further detail below, a0 and a1 may be adjusted to account for variation in component values, such as changes in inductance values either due to component variation over time, or due to varying amounts of current going through the inductors (which would affect their inductance value). For example, rather than having only the "R" factor, the a0 and a1 weights are parameters corresponding to "s" terms, in which case the damping algorithm is a transfer function that is usable for accounting for flexibility in the filter component values. In some embodiments, the values a0 and a1 are dynamically tuned, along with R, to take into account filter component variation. Further details regarding accounting or compensating for filter component variation are described below.

In some embodiments, when the damping algorithm is running, the grid current is measured via a current sensor at the output of the LCL filter. A current sensor is also placed at the capacitor to determine the current going through the branch of the LCL filter with the capacitor. Using the damping techniques described herein, the inverter voltage (high frequency square waveform 230) is controlled to obtain the desired grid current (through inductors L2 and L22).

As shown in the above examples, and via KVL (Kirchoff s Voltage Law) analysis, by having Rd defined in the manner described above, and by injecting ic*Rd into the control of the inverter by subtracting the product of ic*Rd (which is a voltage) from the output of the PI controller, this results in a behavior that emulates what would occur if Rd were connected in series with the capacitors C1 or C2 (e.g., the ig/v transfer function described above).

In some embodiments, a portion of the transfer function in the control loop is a PR (Proportional-Resonant) controller, which may be given as $$G_{PR} = K_p + \frac{2k_i s}{s^2 + w^2}$$

Where w=2πnf where n is a harmonic number of fundamental frequencies. For example, "n" represents the harmonics of the fundamental 60 Hz frequency (e.g., 60 Hz, 120 Hz, 180 Hz for harmonic numbers 1, 2, 3, etc.).

where f is fundamental frequency.

Below is an embodiment of a pseudocode implementation

//// calculate error between reference current (igref, 306) and actual inverter grid current (igmeasured 308)

$e(k) = Iref - I2$

In some embodiments, the reference current is part of a higher level control system (e.g., for active and reactive power control). As one example, Iref is a desired grid current (e.g., 60 Hz sine wave). I2 is the actual measured grid current.

///// calculate damping $$Kd = \frac{1}{b_o}[a_1 Ic(k) - a_1 Ic(k-2) - b_1 Kd(k-1) - b_2 Kd(k-2)]$$

//// calculate inverter voltage reference $$v\,ref = \frac{1}{b_o}[a_1 e(k) - a_1 e(k-2) - b_1 v\,ref(k-1) - b_2 v\,ref(k-2)] - Kd$$

/// calculate PWM duty=vvref*Vbusinv

The PWM duty cycle, which is determined by the duty above (which is in turn determined by Kd, the calculated damping) is then used to control switches such as the pair of S1 and S2 (214 and 216) to control the square wave that is an input to LCL filter 206, and S3 and S4 (226 and 228) to control the input to LCL filter 218, as will be described in further detail below. In this way, the output current of the inverter is controlled as a function of the measured current through the capacitor of the LCL filter, via the transfer function of the damping algorithm described above. This provides a form of feedback in the inner current control loop to determine how to control the input to the LCL filter to produce a desired output grid current (e.g., with a desired THD, or below a THD threshold).

In the above example, Kd is the product of Ic and Rd (Rd multiplied by ic, the current through the capacitor), and is a voltage value that is subtracted from the voltage reference and error to result in a duty cycle for the PWM controller/modulator for controlling the inverter switches.

In some embodiments, the grid current control is implemented in a micro controller (e.g., controller 128 of FIG. 1).

Embodiments of Grid Connected Control

Figure 4:
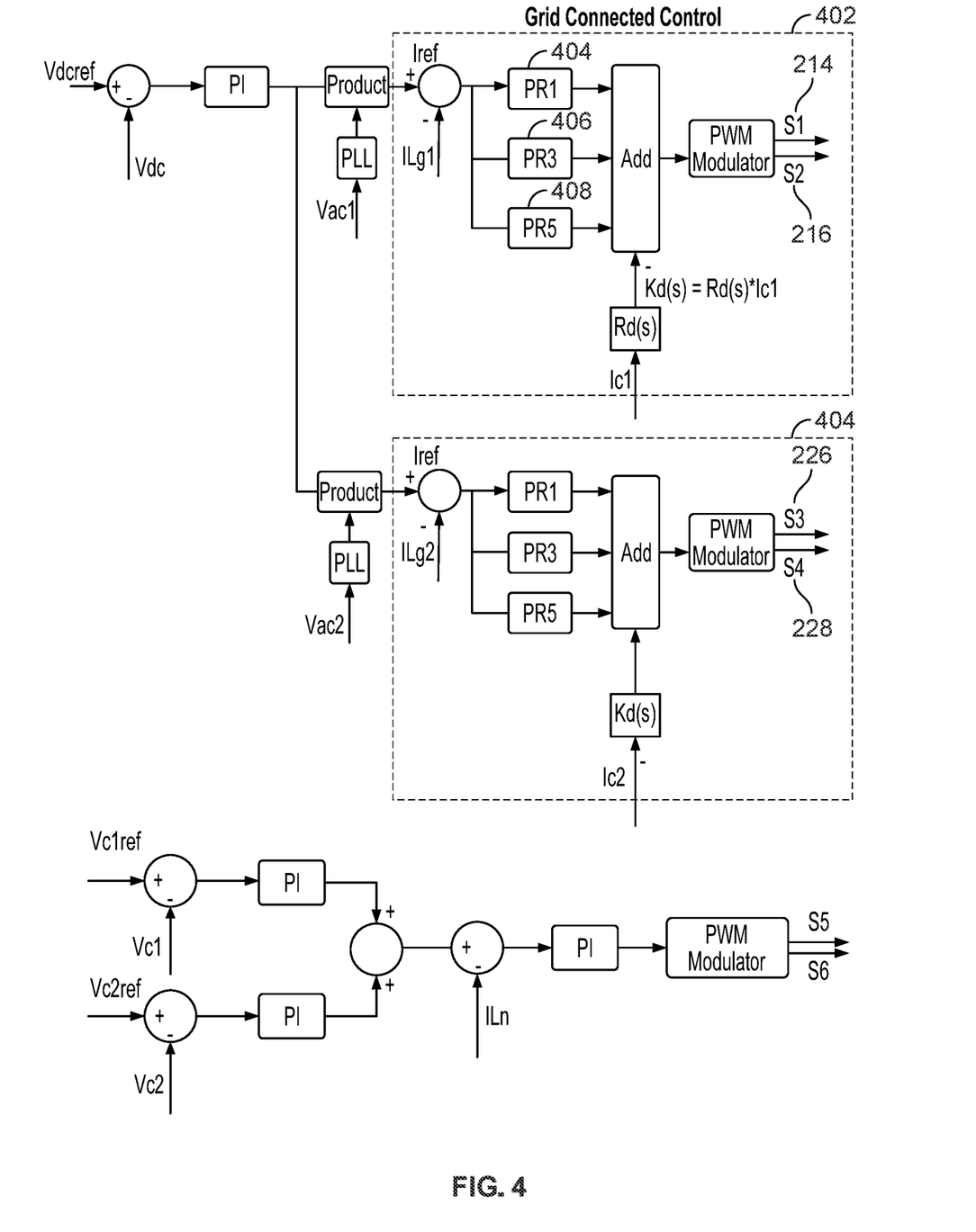
FIG. 4 illustrates an embodiment of grid connected control.

FIG. 4 illustrates an embodiment of grid connected control. The example of FIG. 4 illustrates an embodiment of a control architecture for a grid connected system (e.g., inverter is connected to the grid). In grid-connected mode, a current source architecture is shown, where grid current is to be controlled. As shown in this example, damping of LCL filters 206 and 218 is controlled by control 402 and control 404, respectively. In some embodiments, each of grid-connected control systems 402 and 404 are embodiments of the grid current control 320 shown in the example of FIG. 3.

In the example described herein, the control architecture includes a DC link voltage loop and inner grid current control. In some embodiments, the outer voltage loop attempts to keep the input DC link voltage (DC bus voltage, which includes DC_Bus+ and DC_Bus− at input to the inverter) to a regulated value. In some embodiments, if there is additional power available at the input of the inverter, the current reference from the outer voltage loop increases. In some embodiments, the inner loop is a current controller with damping, and is an embodiment of the grid current control 320 shown in the example of FIG. 3. In some embodiments, proportional-resonant (PR) control is used and tuned at multiple frequencies (e.g., fundamental, third harmonic, etc.) to reduce the harmonics in grid current (e.g., via PR1 404, PR3 406, and PR5 408). The PR controllers are used to reduce harmonics of the 60 Hz fundamental frequency (e.g., 120 Hz, 180 Hz, etc.) in the grid current. In some embodiments, the output of the current controller is subtracted from the damping impedance multiplied by capacitor current to emulate an impedance that is connected in series with the filter capacitor. Similarly, in this example, there is a current control loop for other phase(s) of the inverter along with the damping loop.

In this example, Kd(s) (which is equivalent to, or the same as Rd(s)*ic above) is used to implement a damping algorithm (e.g., to perform damping calculations), as described above.

In some embodiments, Kd(s) (which may be implemented as a microcontroller or other type of processor) takes as input the measured values of the current on the capacitors of the LCL filters, referred to in this example as Ic1 (current on C1 of FIG. 2) and Ic2 (current on C2 of FIG. 2). In some embodiments, the current on the capacitors of the LCL filters is determined using direct sensor readings (e.g., with current sensors placed at the capacitors).

In this example, the damping unit is configured to provide as output a signal that indicates to the inverter what voltage to add to its output voltage, to effectively damp the LCL filter.

For example, by measuring the capacitor current, the damping algorithm calculates or otherwise determines an adjustment to the inverter voltage (e.g., by controlling the PWM block, which controls the square wave that is generated and provided as input to the LCL filters). In some embodiments, the determined adjustment is added to the inverter in real time to effect the desired damping of the LCL filter.

In some embodiments, the damping coefficients of Kd(s) (e.g., the parameters R, a0, and/or a1 of Rd(s) above), implemented via the microcontroller, provide a control system that may be dynamically adjusted to reduce oscillations in the current waveform. For example, in some embodiments, the electrical characteristics of the current at the output of the LCL filter are determined. For example, the THD of the output current is determined. If the current waveform is determined to have a THD that is out of bounds (e.g., greater than 5%), then the Rd transfer function is tuned by adjusting the R, a0, and/or a1 parameters of the transfer function such that THD is brought within specification. As another example, the parameters may be tuned based on variation of inductance and/or capacitance values, which may vary based on age, as a function of current, etc. For example, the current through an inductor is determined. Based on the current, the inductance of the inductor is determined (which may vary as a function of the current passing through it). To compensate for the change in inductance value at that current, one or more parameters of the Rd transfer function are adjusted. As another example, the inductance value for an inductor may change with age. In some embodiments, the controller is provided a lifetime model for the LCL filter components, which models, at various ages, the values for the LCL filter components. Based on the current age of the LCL filter components, the parameters of the Rd(s) transfer function are dynamically adjusted to compensate for the current age of the components. In other embodiments, the inductance and/or capacitance values of the LCL filters are periodically measured to determine their current values. The Rd(s) function parameters are then adjusted based on the current values for the LCL filter components. Further details regarding accounting for filter component variation are described below.

In this way, the damping of the LCL filter is dynamically adjusted over time and usage, and is not fixed, for example, after manufacturing time.

As one example of performing damping, the capacitor current (e.g., C1 or C2 in the LCL filters of FIG. 2) is measured. In some embodiments, the capacitor current (Ic1 for the capacitor C1) is transferred through Kd(s). In some embodiments Kd(s) is implemented as a PI (proportional integral) controller, as described above.

As described above, the damping is implemented by emulation of a virtual impedance in series with the capacitor of the LCL filter. This is in contrast to implementing damping by adding a physical resistor in series with the capacitor (e.g., a resistor in series with C1, and a resistor in series with C2 of FIG. 2). The addition of a series resistance is analogous to adding a shock absorber to a car. The addition of the physical resistor would provide a drag on the system, damping out any oscillations, and preventing the system from oscillating.

While adding physical resistors would reduce oscillations, adding physical resistors to the capacitors will incur a large power loss, as the physical resistor would draw a large amount of electrical power and generate a large amount of heat, resulting in large inefficiencies.

In some embodiments, to avoid the use of a physical resistor and the large power losses and inefficiencies described above, the effect of the physical resistor on the LCL filtering is emulated by the damping algorithm described above, which emulates a virtual type of resistor, as described above. For example, an IR drop is introduced virtually, and fed into the control loop. In this way, the damping control scheme alters the operation of the inverter to produce a same effect of the addition of a physical resistor, but without actually requiring adding in of a physical resistor. In some embodiments, the damping control algorithm continuously computes (e.g., periodically, such as every 100 microseconds) what would be occurring were a resistor in series with the capacitor of the LCL filter. In some embodiments, the damping algorithm computes a compensation to apply to the inverter (e.g., by controlling the PWM modulator, which determines how switches S1 and S2, or S3 and S4 are switched on/off) to cause, for example, the currents in the system to follow in a manner as if there were a resistor in series with the capacitance. This results in the inverter behaving as if there were physical resistors in series with the capacitors of the two LCL filters.

In some embodiments, the damping algorithm (Kd(s)) is implemented as a PI controller with a virtual R (resistor), as described above.

Thus, in some embodiments, the transfer function of the damping algorithm effectively incorporates a virtual series resistance into the capacitor in order to mimic the behavior of a physical resistor in series with the capacitor.

The following are further details regarding emulating the behavior of a resistor in series with the capacitor of an LCL filter. As described above, in some embodiments, the current through the capacitor is measured (e.g., by using current sensors at the capacitors C1 and C2). Resistors have a voltage that is proportional to current. In some embodiments, by measuring that current directly, it may be determined that, if there were a resistor in series with the capacitor, there would be a certain amount of voltage drop in that leg of the circuit that is resistance times the current that is measured. In this way, the expected behavior of a physical resistor in series with the capacitor may be computed, which the damping algorithm then attempts to emulate.

In some embodiments, the damping algorithm is a portion of a control scheme, such as that shown in the example of FIG. 4. In the example of FIG. 4, the control system includes PR1 (404), PR3 (406), and PR5 (408), which may be used as inputs to the PWM (pulse-width modulation) block to reduce harmonics (e.g., first, third, and fifth harmonics at 60 Hz, 180 Hz, and 300 Hz, respectively, in this example). In some embodiments, the damping algorithm operates in parallel of controlling the main current. In the example of FIG. 4, the output of the damping algorithm Kd(s) is a signal that is added (or subtracted) to the PWM (pulse-width modulation) voltage block. In some embodiments, the output of the PWM block is then used to control the switches on the inverter, S1 (214) and S2 (216). For example, the PWM modulator block sends on/off signals to the switches, turning them on or off. As one example, the damping algorithm Kd(s) computes the voltage to apply to the filter, such as at the output of S1 and S2, or the output of S3 (226) and S4 (228). In some embodiments, the PWM modulator block uses that information to calculate the duty cycle that the switches should be on or off at in order to achieve the desired voltage to apply to the filter. In some embodiments, the PWM modulator block then sends the on/off signals to the switches according to the duty cycle calculated based at least in part on the signal outputted from the Kd(s) damping algorithm.

As shown in this example, the actuation of the switches of the inverter is controlled in part by the damping algorithm in order to damp the oscillations of the filter so that it does not ring uncontrolled. That is, the filtering performance and characteristics of the LCL filter (e.g., its transfer function between the output and the input of the LCL filter) are controlled via a form of feedback between the output of the LCL filter and the input of the LCL filter (which is the square wave form generated by the switches controlled by the PWM). For example, the desired output current of the LCL filter (e.g., with a THD below a threshold) is achieved by modulating the input of the LCL filter to produce the desired output current. The square waveform that is an input of the LCL filter is determined based on the duty cycle computed by the PWM controller. The duty cycle computed by the PWM controller is determined in part based on Kd(s), which is a function of emulated impedance or resistance multiplied by the measured current through the capacitor of the LCL filter. Via the KVL analysis described above, the measured current through the capacitor of the LCL filter is determined as a function of the output current. In this way, a portion of the output current of the LCL filter is used, in conjunction with the dynamically variable Rd(s) virtual impedance, control of the PWM, etc. to control the input to the LCL filter to result in the desired output current.

Using the damping techniques described herein, a higher order filter such as a second order LCL filter that has small inductances, may be used that is also stable.

Emulation of the behavior of a series resistance on a capacitor may be implemented for various types of inverter architectures and control schemes. For example, with a voltage source control scheme, the output of the damping algorithm may be used to inject or add a compensation voltage (e.g., as shown in the grid-connected and standalone control shown in the examples of FIGS. 4 and 5).

As another example, consider, for example, a current source architecture. Suppose that current control is implemented on the primary inductors (e.g., the primary control loop is on the primary inductors L1 and L11 instead of the secondary inductors L2 and L22. In some embodiments, the virtual resistance (in series with the capacitor of an LCL filter) may be implemented with a current control approach. As one example, current control may be implemented by adding compensation before a reference current (and, for example, modifying current references). In some embodiments, the reference current (e.g., Iref) is the desired value of current to flow to the grid. In some embodiments, the damping algorithm is configured to calculate an addition to the current references to create a desired damping effect, but through current source techniques.

While the above embodiments of damping techniques have been described in the context of a grid connected system for illustrative purposes, the damping techniques described herein may be variously adapted to accommodate other scenarios, such as when the inverter is operating in a standalone manner (and not connected to the grid, such as in a backup mode). For example, even when in a backup mode, and off grid, there may be loads that can cause instability of the filter, where the damping techniques described herein may be used to dampen any such oscillations. Embodiments of standalone control are described below.

Embodiments of Standalone Control

Figure 5:
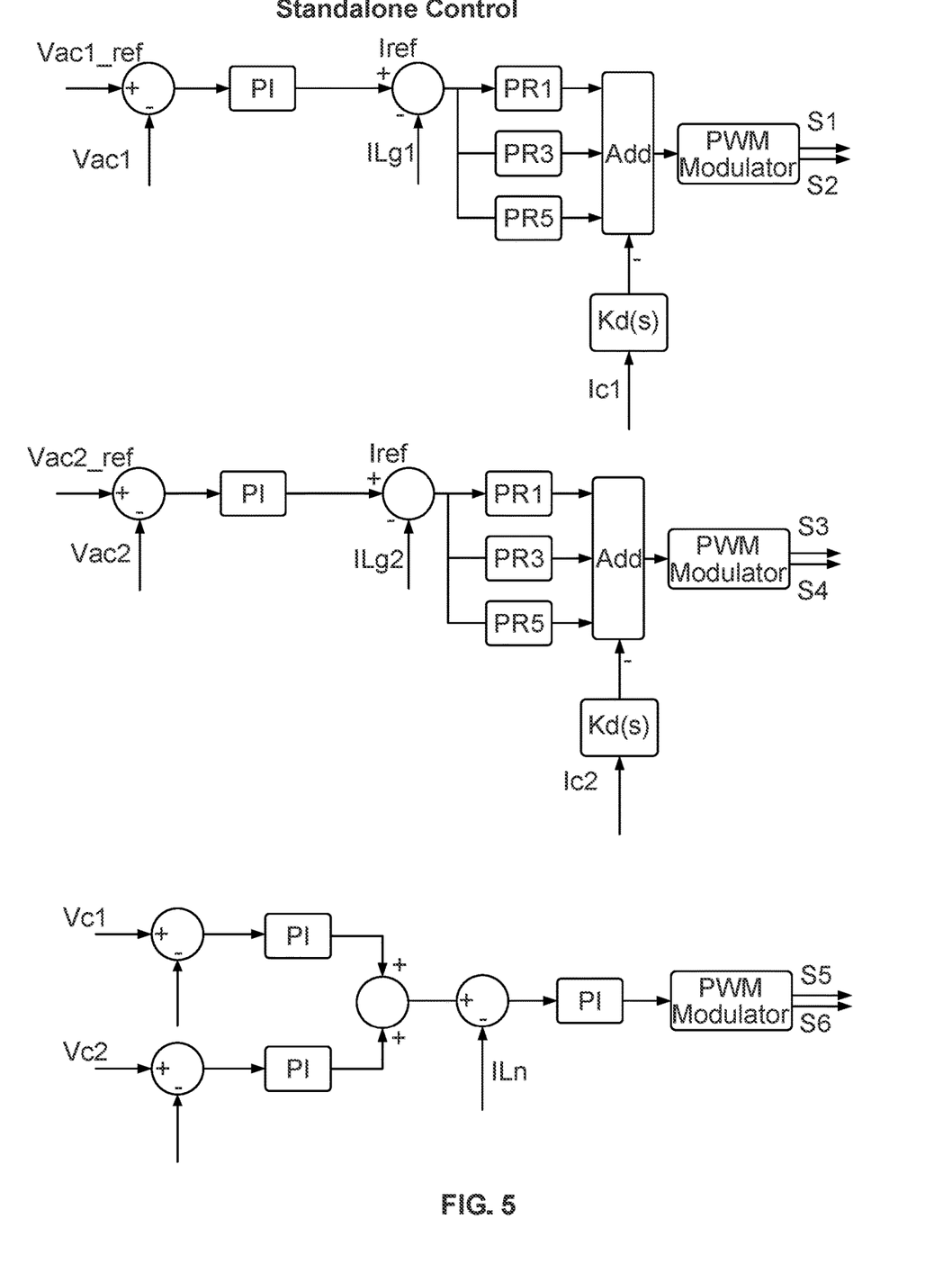
FIG. 5 illustrates an embodiment of standalone control.

FIG. 5 illustrates an embodiment of standalone control. In some embodiments, standalone control is used in scenarios when the inverter is not connected to the AC supply grid (e.g., during microgrid operation, or during power cuts). In standalone mode, a voltage source type of architecture is shown, where the AC output voltage is controlled, and the inner loop is a current control loop. In some embodiments, the inverter is operated in such a way that it controls output AC voltage. FIG. 5 illustrates an embodiment of standalone control of a split phase inverter (such as that shown in the example of FIG. 2). In some embodiments, the standalone control includes an outer output voltage control loop that is used to control the output voltage to, for example, 120V AC RMS. In some embodiments, the output of the AC voltage loop is given to the inner current loop as a reference grid current. In this example, the inner current loop is an embodiment of a PR controller to reduce first, third, and fifth harmonics in the current. In some embodiments, output of the current controller is subtracted with damping impedance multiplied by filter capacitor current.

In the case of standalone control, there may still be instability in the waveform of the current provided by the inverter to loads in a site such as a house to which the inverter is providing power. Similarly to as described above in the grid-connected scenario, if the current waveform is determined to have a THD that is out of bounds, then the Rd transfer function is tuned by adjusting the R, a0, and/or a1 parameters of the transfer function such that THD is brought within specification. The parameters for Rd(s) may also be adjusted dynamically to adjust for filter component variation (e.g., due to degradation over time, the amount of current flowing through a component, etc.). Further details regarding accounting for filter component variation are described below.

Accounting for Filter Component Variation

Parameter variation of components such as inductances and capacitances may have a large impact on THD. Consider that an inverter may have an expected operating lifetime of 20 years. Over the 20 years, the inductance of an inductor in the LCL filter may degrade. The capacitance of the capacitor in the LCL filter may also degrade significantly. With degradation over a period of time, THD will increase. However, using the techniques described herein, even with component degradation, THD increase is mitigated by having a variable damping factor, where the various parameters of the damping factor (e.g., R, a0, and a1 of Rd(s) described above) may be dynamically tuned over the life of the inverter to account for such variation.

Further, as described above, the inductance of inductors such as L1, L2, L11, and L22 are a function of current, which results in another example of variation of LCL component values. For example, suppose an inductor is designed to have a certain inductance at 60 A (amps). However, suppose that 70 A is being passed through the inductor at a given moment. The inductance value of the inductor will decrease. If the inductance value is decreased, then harmonics will increase. Total Harmonic Distortion then increases, and may go out of bounds of requirements (e.g., greater than 5%). The inductance value of the inductor may also change over time due to component degradation or variation over time as described above.

In some embodiments, to dynamically determine the amount of damping to apply (e.g., to determine what the R, a0, and a1 parameters should be updated to in order to bring THD within specification), a controller implementing damping of the LCL filter of the inverter (e.g., controller 128, used to implement the grid-connected and standalone control schemes described above) is configured to perform a function such as a Fourier transform on the output current waveform. The Fourier transform is used to determine the THD of the output current. The parameters of the damping factor are tuned or adjusted according to the determined THD, which may change over time (or due to the changing current through the components). For example, the R, a0, and a1 values are tuned in response to determining that THD is out of bounds (e.g., THD is greater than 5%, or any other threshold as appropriate). In some embodiments, the values of R, a0, and a1 are determined by performing a stability analysis of the system.

In some embodiments, the component variation over time is modeled. For example, reliability testing is performed on the inductors and capacitors of the LCL filters. The reliability testing is used to determine a model of the components that predicts the capacitance or inductance of the LCL filter components over a period of time. For example, the model may be used to estimate the capacitance of the capacitor in the LCL filter at the first year, at five years, etc. These component values are stored in the microcontroller, along with the expected time at which those component values are predicted. The age of the inverter system is also recorded. The inverter controller then uses these values, along with the age of the system (which in turn is used to determine the age of the components of the LCL filter), to tune the parameters of the damping transfer function over time (e.g., according to the component degradation model, which indicates component values predicted over the course of several years).

In this way, dynamic, online parameter tuning is performed to meet requirements (e.g., THD requirements), and component degradation over time may be compensated for to produce a current that is within requirements or specifications.

Thus, if the control system is a fixed damping factor as in existing systems, which is designed for a specific inductance value (that is, for example, rated at a certain current), then it may be less effective in damping instability when there is variation in the inductance value. In contrast to being fixed, the damping techniques described herein provide a dynamically tunable control system that is capable of being dynamically tuned for variation in inductance values and allowing for various operating margins.

As described above, a processor, such as a microcontroller is used to perform control of the inverter. This includes determining the duty cycle for the PWM modulator. The duty cycle for the PWM modulator is controlled in a manner to produce a grid current (e.g., in grid connected case) that would result if a resistance (Rd) were in series with the capacitor current. This reduces instability.

As described above, the resistance Rd is emulated in the microcontroller. The transfer function for Rd is described above. As also described above, the parameters for Rd, such as R, a0, and a1 in the damping algorithm above can be dynamically adjusted via the microcontroller. For example, the parameters of Rd may be dynamically adjusted to modify the amount of total harmonic distortion in the grid current (e.g., to reduce it or otherwise bring it within specification). This is an improvement over existing control systems, in which the damping is not dynamically variable and cannot be changed after initial programming (i.e., the damping is fixed). Here, rather than the damping factor being a fixed resistance, Rd here is a higher order transfer function that can be dynamically tuned via adjustment of various parameters (e.g., R, a0, and a1) by the software/firmware of the microcontroller.

Using the techniques described herein, the damping factor Rd may be tuned in an online manner to meet THD requirements (e.g., to keep it below 5%, or below any other threshold as appropriate), even in the face of component variation over time. For example, the amount of damping that is implemented is controlled to compensate for variation in the inductance value.

As one example, suppose, in some cases, the PI values are fixed, but the THD is greater than a threshold requirement (and is out of spec). In some embodiments, the parameters of the damping factor Rd(s) are tuned to reduce the THD to be within specification. In some embodiments, the system includes a current sensor to measure the grid current. The control system is configured to measure the THD of the grid current. The microcontroller determines whether the THD is above or below a threshold value. If the THD is above the threshold value, the microcontroller adjusts the parameters (e.g., R, a0, and/or a1) of the Rd(s) transfer function accordingly until the THD of the measured grid current is below the 5% threshold (or any other threshold as appropriate). In this way, the damping control algorithm dynamically determines the input to provide to the PWM controller (e.g., to determine a duty cycle) to control the switches to adjust the input voltage to the LCL filter such that the grid current at the output of the LCL filter is within the THD specification or requirements. As one example, the control logic is implemented in a computing language such as C (other computing languages may be used, as appropriate). In some embodiments, the damping is dynamically adjusted in response to variation of grid impedance.

Figure 6:
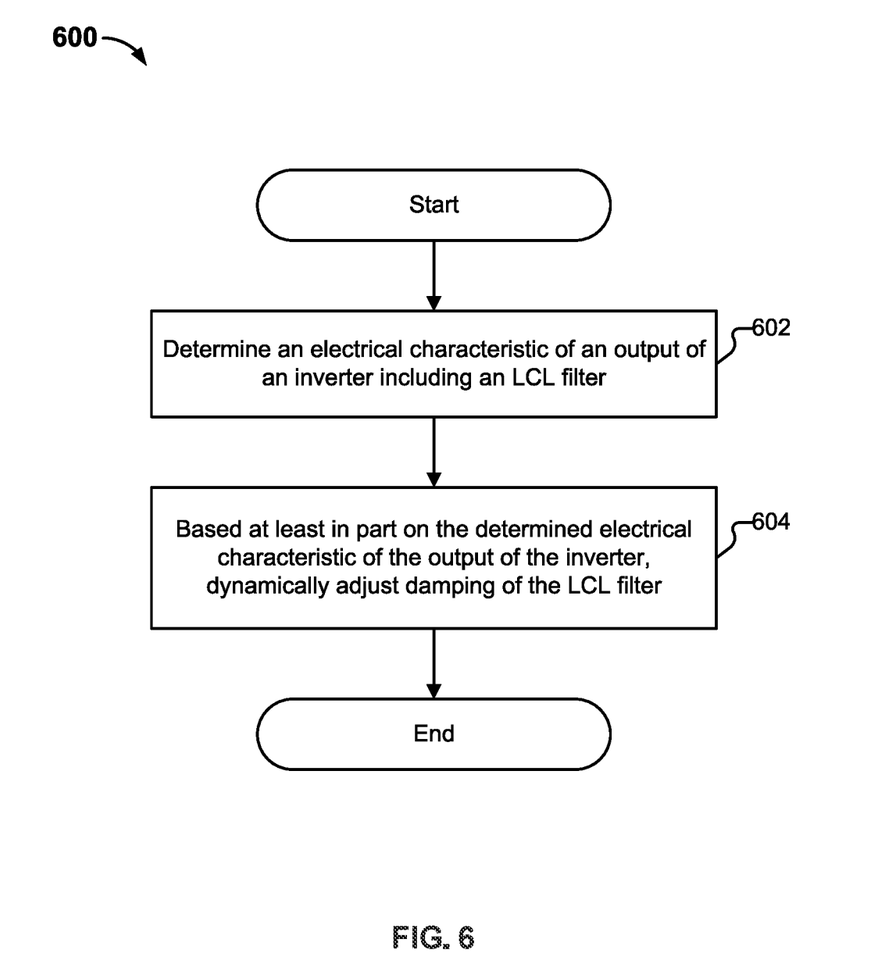
FIG. 6 is a flow diagram illustrating an embodiment of filter damping.

FIG. 6 is a flow diagram illustrating an embodiment of filter damping. In some embodiments, process 600 is executed by controller 128 of FIG. 1. As described above, in some embodiments, controller 128 is used to implement the control mechanisms described herein, such as grid current control 320 of FIG. 3, grid connected control 402 and 404 of FIG. 4, and the standalone-mode control of FIG. 5.

The process begins at 602 when an electrical characteristic of an output of an inverter including an LCL filter (a second order filter made up of two inductors and a capacitor) is determined. For example, a THD of the current at the output of the inverter is determined. The inverter may be either grid connected or standalone (disconnected from the grid).

At 604, based at least in part on the determined electrical characteristic of the output of the inverter, damping of the LCL filter is dynamically adjusted. As one example, damping of the LCL filter is implemented by emulating a virtual resistance in series with a capacitor of the LCL filter. As one example, the virtual resistance is adjustable, with tunable parameters. In some embodiments, based on the determined electrical characteristic of the output of the inverter, the parameters of the emulated virtual resistance are adjusted. For example, if the THD of the output current is outside of a specification (e.g., greater than a threshold permitted percentage of THD), then the parameters of the virtual resistance are adjusted to change the resistance value of the virtual resistance to cause the output current to be within the THD specification.

In some embodiments, the virtual resistance is multiplied by a current determined to be passing through the capacitor of the LCL filter (either via measurement by a current sensor used to measure current passing through the capacitor, or via determination from other current measurements). This voltage is then used as an input to a PWM controller. The PWM controller uses the voltage (virtual resistance multiplied by current through capacitor of LCL filter) to determine a duty cycle. A set of switches is controlled according to the duty cycle to generate a square waveform (that will be filtered/smoothed by the LCL filter).

The damping may also be dynamically adjusted (by adjusting the aforementioned tuning parameters) based on a determination of component variation, which may be due to the current passing through the components or due to degradation over time, all of which may affect THD. For example, the inductance value for an inductor (or the capacitance value for a capacitor) is determined as a function of the current determined to be passing through (or a voltage across) the component. The damping (e.g., emulated virtual resistance) is a function of the inductance of the capacitance values. The damping is adjusted to achieve a desired THD by tuning the tunable parameters of the damping function, given the determined inductance and/or capacitance values.

As another example, to compensate for component degradation over time (e.g., due to age), the microcontroller accesses a lifetime model of the LCL components to determine, for a given age (e.g., measured from when the inverter was initialized or from manufacture date of components), the capacitance and inductance values of the capacitor and inductors of the LCL filter. Given the component values, the damping is adjusted to achieve a desired THD by updating the tunable parameters of the damping function.

Described herein are embodiments of LCL filter damping. Using the techniques described herein, the damping is dynamically adjustable. This is in contrast to existing damping techniques that are fixed. The dynamically adjustable damping described herein allows for real-time, online control of damping to regulate for THD, component variation, etc.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A power system comprising:
   an inverter comprising an LCL filter, the LCL filter comprising a first inductor, a capacitor, and a second inductor; and
   a controller configured to:
      determine an electrical characteristic of an output of the inverter, wherein the electrical characteristic of the output of the inverter comprises a measured Total Harmonic Distortion (THD) of an output current of the inverter; and
      based at least in part on the determined electrical characteristic of the output of the inverter, dynamically adjust damping of the LCL filter, wherein the damping of the LCL filter is dynamically adjusted in response to a determination that the measured THD exceeds a threshold.

2. The power system of claim 1, wherein the controller is further configured to determine an inductance of the first inductor, and wherein the damping of the LCL filter is dynamically adjusted based at least in part on the determined inductance of the first inductor.

3. The power system of claim 2, wherein the inductance of the first inductor is determined as a function of current passing through the first inductor.

4. The power system of claim 1, wherein the damping of the LCL filter is adjusted at least in part by adjusting an input to a PWM (Pulse-Width Modulation) controller based at least in part on the determined electrical characteristic of the output of the inverter.

5. The power system of claim 4, wherein the PWM controller is configured to determine a duty cycle, and wherein the duty cycle is based at least in part on the determined electrical characteristic of the output of the inverter.

6. The power system of claim 5, wherein the inverter comprises a set of switches, wherein the set of switches is used to determine a square-waveform that is an input to the LCL filter, and wherein the set of switches is controlled based at least in part on the determined duty cycle.

7. The power system of claim 6, wherein the duty cycle is further based at least in part on an output of one or more PR (Proportional-Resonant) controllers.

8. The power system of claim 1, wherein the inverter is connected to a utility grid.

9. The power system of claim 8, wherein the damping is comprised in an inner current control loop when the inverter is connected to the utility grid.

10. A method, comprising:
    determining an electrical characteristic of an output of an inverter, the inverter comprising an LCL filter, and the LCL filter comprising a first inductor, a capacitor, and a second inductor, wherein the electrical characteristic of the output of the inverter comprises a measured Total Harmonic Distortion (THD) of an output current of the inverter; and
    based at least in part on the determined electrical characteristic of the output of the inverter, dynamically adjust damping of the LCL filter, wherein the damping of the LCL filter is dynamically adjusted in response to a determination that the measured THD exceeds a threshold.

11. The method of claim 10, further comprising determining an inductance of the first inductor, and wherein the damping of the LCL filter is dynamically adjusted based at least in part on the determined inductance of the first inductor.

12. The method of claim 11, wherein the inductance of the first inductor is determined as a function of current passing through the first inductor.

13. The method of claim 10, wherein the damping of the LCL filter is adjusted at least in part by adjusting an input to a PWM (Pulse-Width Modulation) controller based at least in part on the determined electrical characteristic of the output of the inverter.

14. The method of claim 13, wherein the PWM controller is configured to determine a duty cycle, and wherein the duty cycle is based at least in part on the determined electrical characteristic of the output of the inverter.

15. The method of claim 14, wherein the inverter comprises a set of switches, wherein the set of switches is used to determine a square-waveform that is an input to the LCL filter, and wherein the set of switches is controlled based at least in part on the determined duty cycle.

16. The method of claim 15, wherein the duty cycle is further based at least in part on an output of one or more PR (Proportional-Resonant) controllers.

17. The method of claim 10, wherein the inverter is connected to a utility grid.

18. The method of claim 17, wherein the damping is comprised in an inner current control loop when the inverter is connected to the utility grid.

* * * * *